United States Patent Office 3,014,381
Patented Dec. 26, 1961

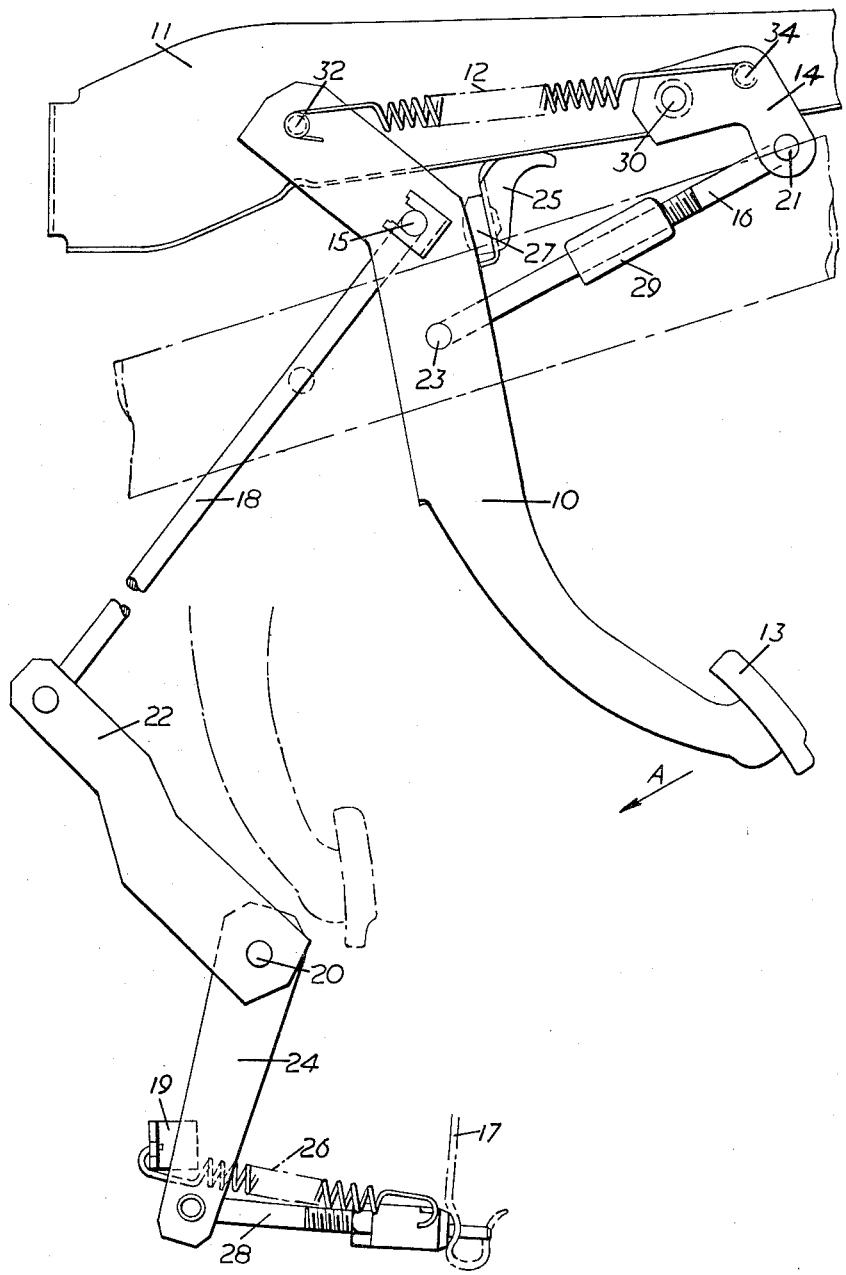

3,014,381
CLUTCH CONTROL
Wilhelm Frank, Russelsheim (Main), Germany, assignor to General Motors Corporation, Detroit, Mich., a corporation of Delaware
Filed Jan. 11, 1960, Ser. No. 1,636
Claims priority, application Germany Jan. 24, 1959
4 Claims. (Cl. 74—512)

This invention relates to the control of clutch application in a motor vehicle.

According to the invention a suspended clutch pedal (that is, a clutch pedal pivoted above the point of application of the driver's foot pressure) is connected by means of a rod to a spring-loaded V-shaped lever such that pressure on the pedal moves the spring over center to allow its force to act through the rod to assist pedal movement.

The scope of the monopoly is defined by the appended claims; the invention and how it can be performed are hereinafter particularly described with reference to the accompanying drawing; which is a side view of one embodiment of a motor vehicle clutch control according to the invention.

It this embodiment a clutch pedal 10 is pivoted at its upper end about a pivot 32 carried by a fixed part 11 of the vehicle. A tension spring 12 is connected between the pivot 32 and a pin 34 on a V-shaped lever 14. One arm of the V-shaped lever has a pivot 30 to the fixed part of the vehicle and the other arm is connected to the pedal 10 by means of a rod 16 connected between an articulation point 21 on the V-shaped lever and an articulation point 23 on the clutch pedal.

The clutch pedal 10 is shown in full lines in its clutch-engaged position. Pressure on a pedal pad 13 at the lower end of the clutch pedal causes the pedal to pivot in the direction of the arrow A towards the position shown in broken lines, which is the clutch-disengaged position. This pivotal movement of the clutch pedal causes a push rod 18 articulated to the clutch pedal at a point 15 to move a lever 22 anticlockwise about a shaft 20 carried by a fixed part of the vehicle.

The lever 22 and a second lever 24 are non-rotatably fixed to the shaft 210, so that the anticlockwise movement of the lever 22 is transmitted to the lever 24, which causes an adjustable push rod 28 to move a clutch-operating lever 17, against the action of a return spring 26 secured at one end to a bracket 19 on a fixed part of the vehicle, for disengagement of the clutch.

The lentgh of the rod 16 is variable by means of a tightening nut 29. After an amount of pedal travel determined by the setting of this nut, the centre line of the tension spring 12 moves past the pivot 30 of the V-shaped lever. The force of the tension spring 12 then urges the V-shaped lever clockwise, this movement being transmitted to the clutch pedal by means of the rod 16 to assist the movement of the clutch pedal resulting from pressure on the pedal pad, thus facilitating disengagement of the clutch.

When the clutch is to be engaged again the pedal is released. The spring 26 and the conventional clutch return spring (not shown) allow the clutch pedal 10 to resume its clutch-engaged position, travel of the clutch pedal in this direction being limited by a stop 25 on the fixed portion 11, the stop having a rubber buffer 27.

With the tightening nut 29 in the position shown and the clutch pedal 10 in the clutch-engaged position shown, the centre line of the tension spring 12 is just above the line passing through the pivot of the clutch pedal and the pivot 30 of the V-shaped lever. Adjustment of the nut 29 varies the position of the point 34 to which the tension spring 12 is connected, and varies the assistance given to clutch pedal movement by the tension spring 12. It is also possible to replace the spring 12 by a stronger spring and so increase the assistance to pedal movement given by the spring. The nut 29 and the spring 12 are in a readily accessible position, so that it is not difficult to adjust the pressure required for clutch application in accordance with the driver's preference.

The clutch control which has been particularly described thus reduces the foot pressure needed to release the clutch; it is particularly advantageous in heavy vehicles transmitting large torques and so requiring high clutch pressures, and in vehicles whose assembly requirements do not permit large transmission ratios between the clutch pedal and the clutch control lever 17. The clutch control is simple and requires few additional parts.

The clutch return spring does not need to be a particularly strong spring, so that reliability of clutch operation is improved.

I claim:

1. A clutch control mounted on a fixed portion of a motor vehicle frame and comprising a clutch pedal, a pivot from the clutch pedal to the fixed portion of the vehicle frame, a clutch operating member, a push rod linkage between the clutch pedal and the clutch operating member for disengagement of a clutch by movement of the clutch pedal, a V-shaped lever, a pivot from one arm of the V-shaped lever to the fixed portion of the vehicle frame at a point remote from the pivot for the clutch pedal, a tension spring connected between opposite ends of the V-shaped lever and the fixed portion of the vehicle frame, and a connecting rod articulated between the other arm of the V-shaped lever and the clutch pedal and movable by the clutch pedal to move the centre line of the spring past the pivot of the V-shaped lever and so allow the spring to assist clutch pedal movement.

2. A clutch control mounted on a fixed portion of a motor vehicle frame and comprising a clutch pedal, a pivot from the upper end of the clutch pedal to the fixed portion of the vehicle frame, a clutch operating member, a push rod linkage between the clutch pedal and the clutch operating member for disengagement of a clutch by movement of the clutch pedal, a V-shaped lever, a pivot from one arm of the V-shaped lever to the fixed portion of the vehicle frame at a point remote from the pivot for the clutch pedal, a tension spring connected between opposite ends of the V-shaped lever and the fixed portion of the vehicle frame, and a connecting rod articulated between the other arm of the V-shaped lever and the clutch pedal and movable by the clutch pedal to move the centre line of the spring past the pivot of the V-shaped lever and so allow the spring to assist clutch pedal movement.

3. A clutch control mounted on a fixed portion of a motor vehicle frame and comprising a clutch pedal, a pivot from the upper end of the clutch pedal to the fixed portion of the vehicle frame, a clutch operating member, a push rod linkage between the clutch pedal and the clutch operating member for disengagement of a clutch by movement of the clutch pedal, a V-shaped lever, a pivot from one arm of the V-shaped lever to the fixed portion of the vehicle frame at a point remote from the pivot for the clutch pedal, a tension spring connected between opposite ends of the V-shaped lever and the fixed portion of the vehicle frame, and a connecting rod articulated between the other arm of the V-shaped lever and a point intermediate the ends of the clutch pedal and movable by the clutch pedal to move the centre line of the spring past the pivot of the V-shaped lever and so allow the spring to assist clutch pedal movement.

4. A clutch control mounted on a fixed portion of a motor vehicle frame and comprising a clutch pedal, a pivot from the upper end of the clutch pedal to the fixed portion of the vehicle frame, a clutch operating member, a push rod linkage between the clutch pedal and the clutch operating member for disengagement of a clutch by movement of the clutch pedal, a V-shaped lever, a pivot from one arm of the V-shaped lever to the fixed portion of the vehicle frame at a point remote from the pivot for the clutch pedal, a tension spring connected between opposite ends of the V-shaped lever and the pivot of the clutch pedal, and a connecting rod articulated between the V-shaped lever and a point intermediate the ends of the clutch pedal and movable by the clutch pedal to move the centre line of the spring past the pivot of the V-shaped lever and so allow the spring to assist clutch pedal movement.

References Cited in the file of this patent

UNITED STATES PATENTS

| | | |
|---|---|---|
| 2,096,151 | Watt | Oct. 19, 1937 |
| 2,124,258 | Moecker | July 19, 1938 |
| 2,240,783 | Jandus | May 6, 1941 |
| 2,621,538 | Bechman et al. | Dec. 16, 1952 |
| 2,869,392 | Muller | Jan. 20, 1959 |
| 2,882,744 | Keller | Apr. 21, 1959 |
| 2,908,032 | Hatch | Oct. 13, 1959 |

FOREIGN PATENTS

| | | |
|---|---|---|
| 478,968 | Great Britain | Jan. 27, 1938 |